United States Patent
Langevin et al.

(10) Patent No.: US 12,194,569 B2
(45) Date of Patent: Jan. 14, 2025

(54) TRANSPARENT COATING REMOVAL THROUGH LASER ABLATION

(71) Applicant: Lockheed Martin Corporation, Bethesda, MD (US)

(72) Inventors: Jeffrey P. Langevin, Fort Worth, TX (US); Jeffrey T. Drewett, Kennedale, TX (US); David Haynes Coleman, Fort Worth, TX (US); Daniel John Flanagan, Fort Worth, TX (US); Steven E. Twaddle, Aledo, TX (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 17/398,459

(22) Filed: Aug. 10, 2021

(65) Prior Publication Data

US 2023/0047797 A1 Feb. 16, 2023

(51) Int. Cl.
*B23K 26/402* (2014.01)
*B23K 26/08* (2014.01)
(Continued)

(52) U.S. Cl.
CPC .......... *B23K 26/402* (2013.01); *B23K 26/082* (2015.10); *B23K 26/0823* (2013.01);
(Continued)

(58) Field of Classification Search
CPC .... B23K 26/36; B23K 26/402; B23K 26/082; B23K 26/0823; B23K 26/12;
(Continued)

(56) References Cited

U.S. PATENT DOCUMENTS 4,686,128 A 8/1987 Gentilman
5,067,085 A * 11/1991 Wenzel ................ B25J 9/1684
901/44
(Continued)

FOREIGN PATENT DOCUMENTS

CN 106091931 A 11/2016
CN 209094074 U * 7/2019 ............. B08B 13/00
(Continued)

OTHER PUBLICATIONS

Machine English Translation of CN-209094074-U (Year: 2019).*
(Continued)

*Primary Examiner* — Helena Kosanovic
*Assistant Examiner* — Erwin J Wunderlich
(74) *Attorney, Agent, or Firm* — Baker Botts L.L.P.

(57) ABSTRACT

A system includes a robotic arm, a rotisserie control linkage, and a computer system. The robotic arm includes a touch probe and laser head. The rotisserie control linkage is configured to couple to a transport cart. The computer system is communicatively coupled to the robotic arm and the rotisserie control linkage and is configured to control the system to probe, using the touch probe of the robotic arm, a transparent outer layer of an aircraft canopy located on the transport cart in order to determine surface measurements of the aircraft canopy. The computer system also controls the system to ablate, using a plurality of predetermined parameters and the laser head of the robotic arm, an interface layer located between the transparent outer layer and the aircraft canopy, wherein movements of the robotic arm during the ablation are based on the surface measurements.

20 Claims, 6 Drawing Sheets

(51) Int. Cl.

| | |
|---|---|
| *B23K 26/082* | (2014.01) |
| *B23K 26/12* | (2014.01) |
| *B23K 26/324* | (2014.01) |
| *B23K 26/36* | (2014.01) |
| *B23K 26/50* | (2014.01) |
| *B23K 26/57* | (2014.01) |
| *B25J 9/16* | (2006.01) |
| *B64C 1/14* | (2006.01) |
| *B64F 5/40* | (2017.01) |
| *B64F 5/50* | (2017.01) |
| *G01B 5/012* | (2006.01) |
| *G01B 11/00* | (2006.01) |
| *G05B 19/42* | (2006.01) |
| *B23K 26/035* | (2014.01) |
| *B23K 101/34* | (2006.01) |

(52) U.S. Cl.
CPC ............ *B23K 26/12* (2013.01); *B23K 26/324* (2013.01); *B23K 26/36* (2013.01); *B23K 26/50* (2015.10); *B23K 26/57* (2015.10); *B25J 9/1684* (2013.01); *B64C 1/1476* (2013.01); *B64F 5/40* (2017.01); *B64F 5/50* (2017.01); *G01B 5/012* (2013.01); *G01B 11/007* (2013.01); *G05B 19/4207* (2013.01); *B23K 26/037* (2015.10); *B23K 26/0884* (2013.01); *B23K 2101/34* (2018.08)

(58) Field of Classification Search
CPC ...... B23K 26/324; B23K 26/50; B23K 26/57; B23K 26/037; G01B 5/012; G01B 11/007; B64C 1/1476; B25J 9/1684; B64F 5/50; B64F 5/40; G05B 19/4207; B22F 10/00; B29C 64/00
USPC .................................................. 219/121.78
See application file for complete search history.

(56) References Cited

U.S. PATENT DOCUMENTS

| | | | |
|---|---|---|---|
| 5,281,798 A | 1/1994 | Hamm et al. | |
| 5,662,762 A | 9/1997 | Ranalli | |
| 5,986,234 A | 11/1999 | Matthews et al. | |
| 7,750,266 B2 * | 7/2010 | Dane | B23K 26/0884 219/121.85 |
| 8,292,347 B1 * | 10/2012 | Drake | B60J 1/2094 160/370.21 |
| 8,941,027 B2 * | 1/2015 | Paganelli | B23K 26/0853 219/121.78 |
| 9,031,734 B2 | 5/2015 | Froom | |
| 9,278,374 B2 | 3/2016 | Wohl, Jr. et al. | |
| 9,796,089 B2 | 10/2017 | Lawrence, III et al. | |
| 10,011,104 B2 * | 7/2018 | Hendriks | B32B 43/006 |
| 10,022,819 B2 * | 7/2018 | Dorey | B23K 26/26 |
| 10,371,646 B2 | 8/2019 | Boyer | |
| 10,705,402 B2 | 7/2020 | Whittingham et al. | |
| 10,744,539 B2 | 8/2020 | Barclay et al. | |
| 2008/0153403 A1 * | 6/2008 | Burks | B24B 27/0038 451/434 |
| 2010/0159251 A1 * | 6/2010 | Brandt | H05B 3/84 219/121.72 |
| 2013/0129185 A1 * | 5/2013 | Bookout | G06T 7/0004 382/141 |
| 2016/0311062 A1 | 10/2016 | Tiwari et al. | |
| 2018/0021898 A1 * | 1/2018 | Hong | B64F 5/40 118/200 |
| 2018/0111870 A1 * | 4/2018 | Herrnberger | B23K 26/046 |
| 2018/0361571 A1 * | 12/2018 | Georgeson | B25J 9/109 |
| 2018/0370212 A1 * | 12/2018 | Simko | B32B 43/006 |
| 2021/0094121 A1 | 4/2021 | Bolt et al. | |
| 2021/0129971 A1 * | 5/2021 | Brown, Jr. | G01N 21/958 |
| 2021/0205920 A1 * | 7/2021 | Shiraishi | B23K 26/127 |

FOREIGN PATENT DOCUMENTS

| | | | | |
|---|---|---|---|---|
| CN | 112475611 A | * | 3/2021 | ........... B23K 26/064 |
| CN | 112934856 A | * | 6/2021 | ............ B08B 13/00 |
| GB | 2283447 A | | 5/1995 | |
| JP | 2002/219591 A | | 8/2002 | |
| WO | WO 90/14633 A1 | | 11/1990 | |
| WO | WO-2022128800 A1 | * | 6/2022 | |

OTHER PUBLICATIONS

Machine English Translation of CN-112934856-A (Year: 2021).*
Machine English Translation of WO-2022128800-A1 (Year: 2022).*
Machine English Translation of CN-112475611-A (Year: 2021).*
EPO Communication regarding Appln. No. 22189613.7-1103, extended European search report, Mar. 23, 2023.

* cited by examiner

TRANSPARENT COATING REMOVAL THROUGH LASER ABLATION

TECHNICAL FIELD

This disclosure relates in general to coating removal, and more particularly to transparent coating removal through laser ablation.

BACKGROUND

Transparent coatings are utilized in many different applications. As one example, certain portions of aircraft canopies (e.g., "transparencies") may have clear outer performance layers that provide various functions to the aircraft. Transparent coatings such as performance layers of aircraft canopies may need to be removed and replaced in some situations. For example, sun, precipitation, dirt, and other debris may damage the performance layer of the aircraft canopy, thereby requiring the removal and replacement of the performance layer.

SUMMARY OF THE DISCLOSURE

According to one embodiment, a system includes a robotic arm, a rotisserie control linkage, and a computer system. The robotic arm includes a touch probe and laser head. The rotisserie control linkage is configured to couple to a transport cart. The computer system is communicatively coupled to the robotic arm and the rotisserie control linkage and is configured to control the system to probe, using the touch probe of the robotic arm, a transparent outer layer of an aircraft canopy located on the transport cart in order to accurately determine the surface position of the aircraft canopy relative to the position of the robotic arm. The computer system also controls the system to ablate, using a plurality of predetermined parameters and the laser head of the robotic arm, an interface layer located between the transparent outer layer and the aircraft canopy, wherein positions of the laser head of the robotic arm during the ablation are determined using the surface measurements. The computer system also controls the system to rotate the aircraft canopy on the transport cart using the rotisserie control linkage during the probing with the touch probe and during the ablation with the laser head.

Technical advantages of certain embodiments may include providing systems and methods of automatically removing transparent coatings such as clear performance layers of aircraft transparencies. Instead of the typical manual processes currently used to remove such coatings, the disclosed embodiments quickly and automatically remove transparent coatings, thereby saving considerable time and expenses. Furthermore, the disclosed embodiments automatically remove transparent coatings without damaging the underlying structures (e.g., aircraft transparencies). Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Transparent coatings are utilized in many different applications. As one example, certain portions of aircraft canopies (e.g., "transparencies") may have clear outer performance layers that provide various functions to the aircraft. Transparent coatings such as performance layers of aircraft canopies may need to be removed and replaced in some situations. For example, sun, precipitation, dirt, and other debris may damage the performance layer of the aircraft canopy, thereby requiring the removal and replacement of the performance layer. Removing transparent coatings such as performance layers of aircraft canopies is typically a manual process that is both labor and time intensive, requiring many man-hours to complete.

To address these and other problems with removing transparent coatings such as performance layers of aircraft canopies, the disclosed embodiments provide a system that automatically removes transparent coatings using laser ablation. Using an aircraft canopy as a main example, the system utilizes a robotic arm that automatically ablates an interface layer that mechanically bonds a transparent outer performance layer to the aircraft canopy, thereby causing the performance layer to be easily removed from the aircraft canopy. The system utilizes laser parameters that control a laser head of the robotic arm to ablate the interface layer without damaging the underlying aircraft canopy. As a result, the time required to remove and replace performance layers of aircraft canopies is greatly reduced.

To facilitate a better understanding of the present disclosure, the following examples of certain embodiments are given. In no way should the following examples be read to limit or define the scope of the disclosure. Embodiments of the present disclosure and its advantages may be best understood by referring to the included FIGURES, where like numbers are used to indicate like and corresponding parts.

Figure 1:
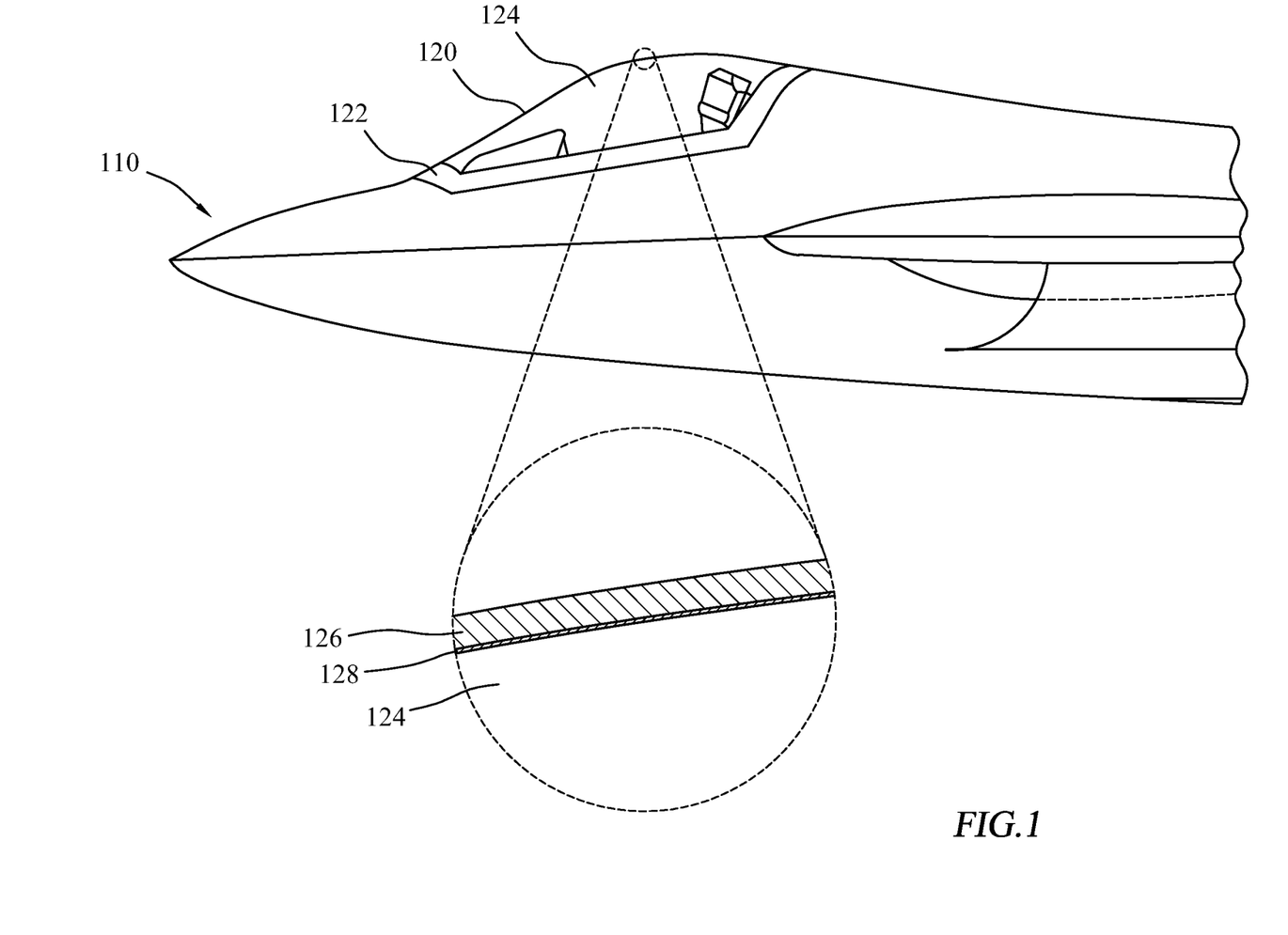
FIG. 1 illustrates an aircraft canopy, according to certain embodiments.

FIG. 1 illustrates an aircraft 110 that includes a canopy 120, according to certain embodiments. Canopy 120 includes a canopy transparency 124 and one or more non-transparent canopy components 122. Non-transparent canopy components 122 may be any portions of canopy 120 that are not transparent (e.g., metal frame portions of canopy 120). Canopy transparency 124 is a clear portion of canopy 120 through which a pilot may view the environment around aircraft 110. In some situations, canopy transparency 124 includes a transparent outer performance layer 126 that is mechanically bonded to canopy transparency 124 with an interface layer 128. Interface layer 128 may include any material such as an adhesive that bonds transparent performance layer 126 to canopy transparency 124. Transparent performance layer 126 and interface layer 128 may be any appropriate thickness.

Aircraft 110 may be subjected to various conditions during flight that damage or erode transparent performance layer 126 of canopy transparency 124. For example, sun, precipitation, dirt, and other debris/objects may damage or erode transparent performance layer 126 such that transparent performance layer 126 must be replaced. Removing transparent performance layer 126 of aircraft canopy 120 is typically a manual process that is both labor and time intensive, requiring many man-hours to complete. However, transparent layer removal system 200, described in detail below, automatically removes transparent performance layer 126 by ablating interface layer 128 while avoiding damaging canopy transparency 124.

Figure 2A:
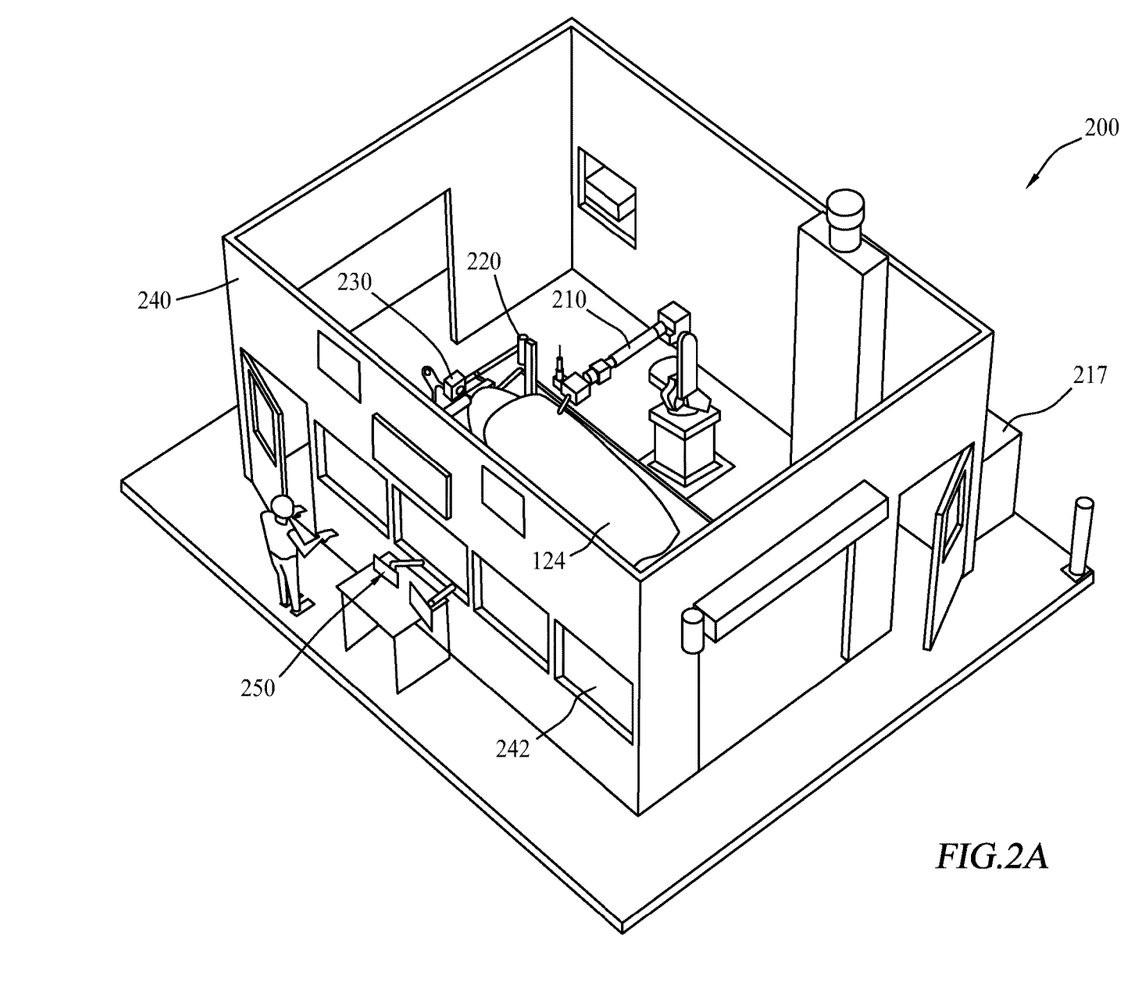
FIGS. 2A and 2B illustrate a system for removing a transparent coating using laser ablation, according to certain embodiments.
Figure 2B:
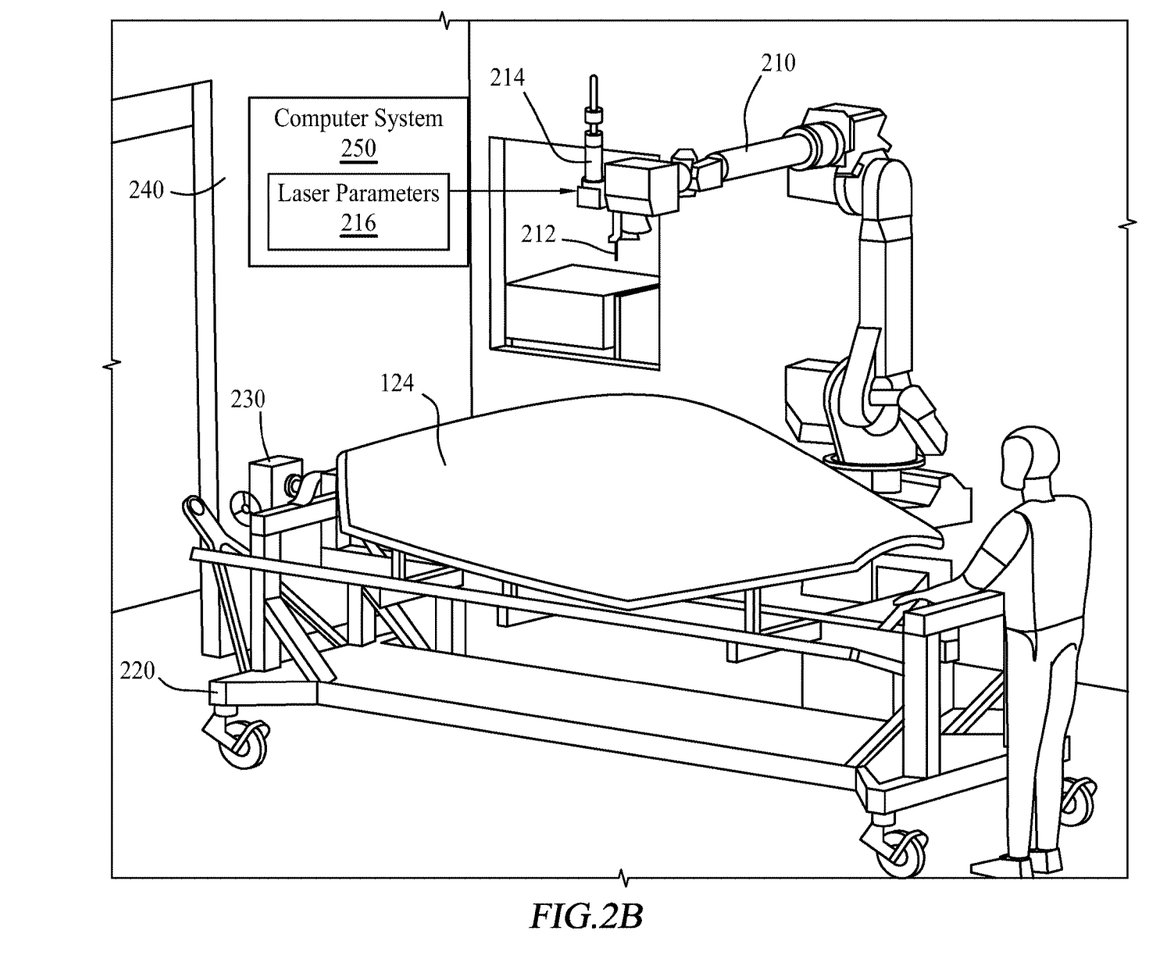

FIGS. 2A and 2B illustrate a transparent layer removal system 200 system for removing a transparent coating such as transparent performance layer 126 using laser ablation, according to certain embodiments. In some embodiments, transparent layer removal system 200 includes a robotic arm 210, a transport cart 220, a rotisserie control linkage 230, an enclosure 240, and a computer system 250. Robotic arm 210 may include a touch probe 212 and a laser head 214. Computer system 250 is communicatively coupled to robotic arm 210 and rotisserie control linkage 230. Robotic arm 210, transport cart 220, and rotisserie control linkage 230 may be housed in enclosure 240. An object to be ablated such as canopy transparency 124 may be placed on transport cart 220 and rolled into enclosure 240 and placed proximate to robotic arm 210.

Robotic arm 210 is any appropriate articulating robotic arm system that is capable of positioning tools such as touch probe 212 and laser head 214 any programmed distance from an object such as canopy transparency 124. Touch probe 212 is a measurement device that non-destructively probes the outer surface of canopy transparency 124 in order to determine surface measurements of canopy transparency 124 (e.g., the surface position of canopy transparency 124 relative to the position of robotic arm 210). Laser head 214 includes any appropriate laser capable of ablating a layer such as interface layer 128 of canopy transparency 124 with a laser beam 215. In some embodiments, the laser of laser head 214 is a near IR (NIR) laser such as a Neodymium laser. Laser head 214 is coupled to a laser source 217, which controls the power and frequency of the laser of laser head 214 (based on laser parameters 216). In general, robotic arm 210 is controlled by computer system 250 and performs two main tasks for transparent layer removal system 200: 1) probing an outer surface of an object such as canopy transparency 124 using touch probe 212, and 2) ablating a layer such as interface layer 128 using laser head 214.

Transport cart 220 is a cart for holding an object to be ablated such as canopy transparency 124. In some embodiments, transport cart 220 includes wheels that allow transport cart 220 to be rolled into enclosure 240 and placed next to robotic arm 210. Transport cart 220 may include mounting hardware that allows objects such as canopy transparency 124 to be secured to transport cart 220. The mounting hardware may be configurable to accommodate various sizes and shapes of canopy transparencies 124 (e.g., canopy transparencies 124 from various types of aircraft 100). In some embodiments, transport cart 220 includes any appropriate mechanism that allows an object such as canopy transparency 124 to be rotated. For example, the mounting hardware of transport cart 220 may be coupled to a center axis that is rotatably coupled to transport cart 220 at each end of transport cart 220. The mounting hardware may rotate about the center axis, thereby allowing robotic arm 210 to access all outer surfaces of canopy transparency 124. In some embodiments, transparent layer removal system 200 includes a rotisserie control linkage 230 that is configured to rotate the mounting hardware of transport cart 220 using any appropriate motor (e.g., an electrical motor). Rotisserie control linkage 230 is communicatively coupled to computer system 250 or robotic arm 210 and may be mechanically coupled to the mounting hardware of transport cart 220 (e.g., the center axis of the mounting hardware of transport cart 220). Computer system 250 or robotic arm 210 may command rotisserie control linkage 230 to rotate the mounting hardware of transport cart 220 during the probing of canopy transparency 124 with touch probe 212 and during the ablation of canopy transparency 124 with laser head 214.

Enclosure 240 is any room or structure for housing robotic arm 210, rotisserie control linkage 230, and transport cart 220. In some embodiments, enclosure 240 includes one or more laser safety windows 242 that allow an operator to view the operation of transparent layer removal system 200 from outside enclosure 240 but prevents laser radiation from laser head 214 from escaping enclosure 240. In some embodiments, computer system 250 is located outside enclosure 240 as illustrated in FIGS. 2A and 2B. In some embodiments, enclosure 240 includes doors or openings that permit transport cart 220 to be rolled into and out of enclosure 240.

Computer system 250 is communicatively coupled to robotic arm 210 and rotisserie control linkage 230. Computer system 250 controls the operations of robotic arm 210, touch probe 212, laser head 214, and rotisserie control linkage 230 in order to probe transparent performance layer 126 and then ablate interface layer 128 as described in more detail below in reference to FIG. 4. A particular embodiment of computer system 250 is illustrated and described in reference to FIG. 5.

Figure 3A:
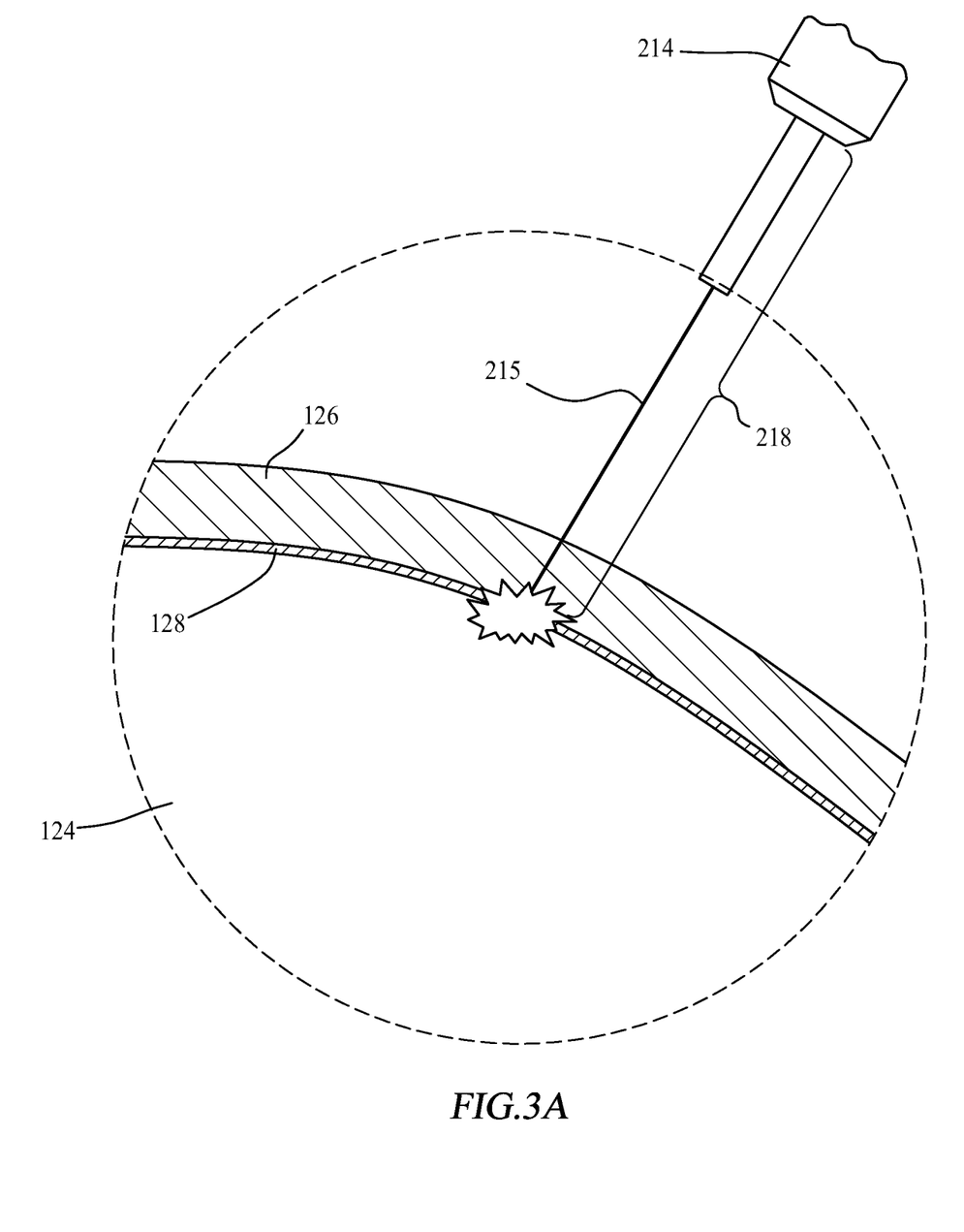
FIG. 3A illustrates a transparent coating of the aircraft canopy of FIG. 1 being removed by the system of FIGS. 2A and 2B, according to certain embodiments.
Figure 3B:
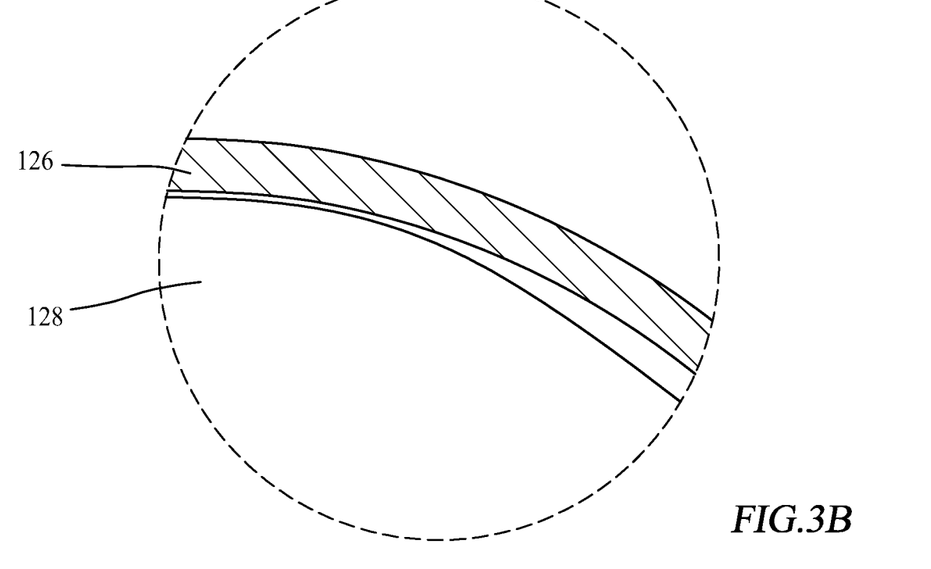
FIG. 3B illustrates the transparent coating of the aircraft canopy of FIG. 1 after it has been removed by the system of FIGS. 2A and 2B, according to certain embodiments.

The operation of transparent layer removal system 200 will now be described in reference to FIGS. 3A-3B. FIG. 3A illustrates transparent performance layer 126 of canopy transparency 124 being removed by transparent layer removal system 200, and FIG. 3B illustrates transparent performance layer 126 after it has been removed by transparent layer removal system 200. First, transparent layer removal system 200 probes, using touch probe 212 of robotic arm 210, the outer surface of transparent performance layer 126 of canopy transparency 124 in order to determine surface measurements of canopy transparency 124. The surface measurements provide transparent layer removal system 200 with an accurate 3D model of canopy transparency 124 (e.g., physical dimensions of canopy transparency 124) and provide the surface position of canopy transparency 124 relative to the position of robotic arm 210. As illustrated in FIG. 3A, transparent layer removal system 200 next utilizes laser head 214 to ablate interface layer 128. In this step, transparent layer removal system 200 utilizes predetermined laser parameters 216 to control laser head 214. Laser parameters 216 include at least a laser focal length 218 as illustrated in FIG. 3A. Laser parameters 216 are discussed in more detail below. Also in this step, transparent layer removal system 200 utilizes the surface measurements obtained from touch probe 212 to control the location of laser head 214 (e.g., the surface measurements control the distance between laser head 214 and the outer surface of transparent performance layer 126). Once interface layer 128 has been ablated by transparent layer removal system 200, transparent performance layer 126 will be separated from canopy transparency 124, as illustrated in FIG. 3B, and can be removed.

Laser parameters 216 are predetermined parameters for controlling the operation of the laser of laser head 214. In some embodiments, laser parameters 216 include a laser fluence, a speed, a wavelength, and laser focal length 218. The laser fluence parameter controls the power per unit area of laser beam 215 and may be selected based on the specifications (e.g., thickness and material) of interface layer 128. The laser fluence is selected to properly ablate interface layer 128 without damaging canopy transparency 124. If the laser fluence is too high, laser beam 215 may damage canopy transparency 124. If the laser fluence is too low, interface layer 128 may not be properly ablated. The speed parameter of laser parameters 216 controls the linear speed in which laser head 214 passes over canopy transparency 124. The speed parameter may be selected to minimize the impact of laser beam 215 on canopy transparency 124. If the speed parameter is too low, laser beam 215 may damage canopy transparency 124. If the speed parameter is too high, interface layer 128 may not be properly ablated.

The wavelength parameter of laser parameters 216 is selected based on the material of interface layer 128. In general, the wavelength is selected to be the most effective wavelength of laser beam 215 to remove interface layer 128. Laser focal length 218 is selected so that laser beam 215 from laser head 214 passes through transparent performance layer 126 and is focused on interface layer 128. Laser focal length 218 may be based on the thickness of transparent performance layer 126 and the thickness of interface layer 128.

Figure 4:
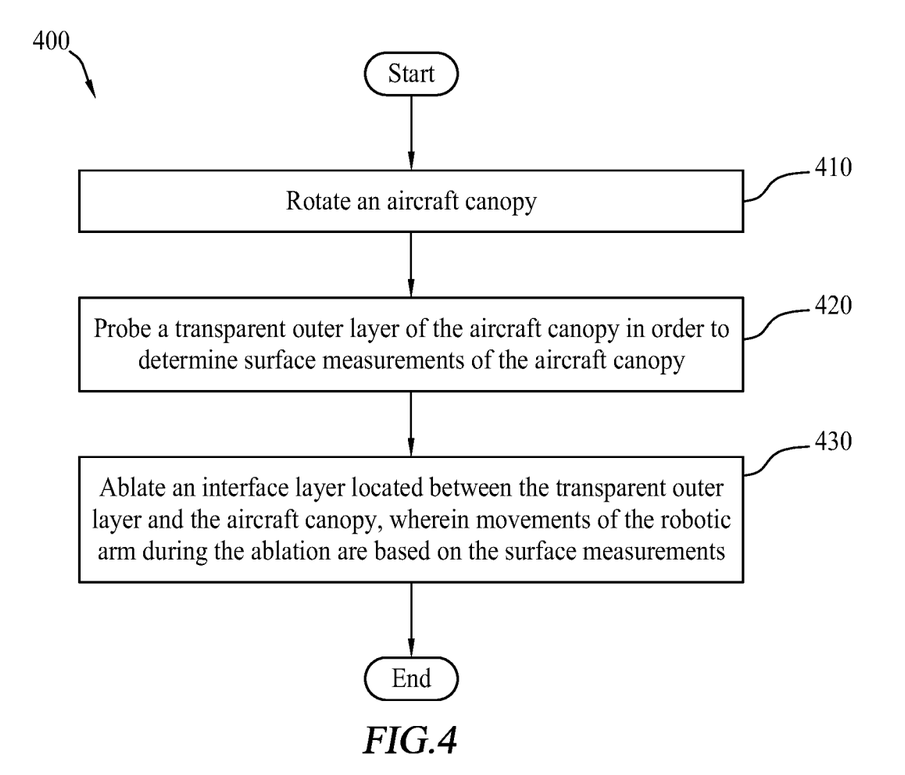
FIG. 4 illustrates a method that may be utilized to remove a transparent coating using laser ablation, according to certain embodiments.

FIG. 4 illustrates a method 400 that may be utilized by transparent layer removal system 200 to remove a transparent coating such as transparent performance layer 126 using laser ablation, according to certain embodiments. At step 410, method 400 rotates an object. In some embodiments, the object is canopy transparency 124 that is located on transport cart 220. In some embodiments, the object is rotated by an electrical motor such as rotisserie control linkage 230.

In step 420, method 400 probes, using a touch probe of a robotic arm, a transparent outer layer of an object order to determine surface measurements. In some embodiments, step 420 is performed simultaneously with step 410. In some embodiments, the object is an aircraft canopy such as canopy 120 or a transparency such as canopy transparency 124. In some embodiments, the object is located on a transport cart such as transport cart 220. In some embodiments, the touch probe is touch probe 212, and the robotic arm is robotic arm 210. The surface measurements obtained in step 410 may be used, for example, to create a 3D model of the object to be ablated and/or to control movements of the robotic arm during step 430.

At step 430, method 400 ablates an interface layer located beneath the transparent outer layer of the object. In some embodiments, the interface layer is interface layer 128 located between transparent performance layer 126 and canopy transparency 124. In some embodiments, step 430 uses predetermined parameters and a laser head of the robotic arm. The predetermined parameters may be laser parameters 216, and the laser head may be laser head 214. In some embodiments, movements of the robotic arm (e.g., the positions of the laser head of the robotic arm during the ablation) are determined or otherwise based on the surface measurements of step 410. After step 430, method 400 may end.

Figure 5:
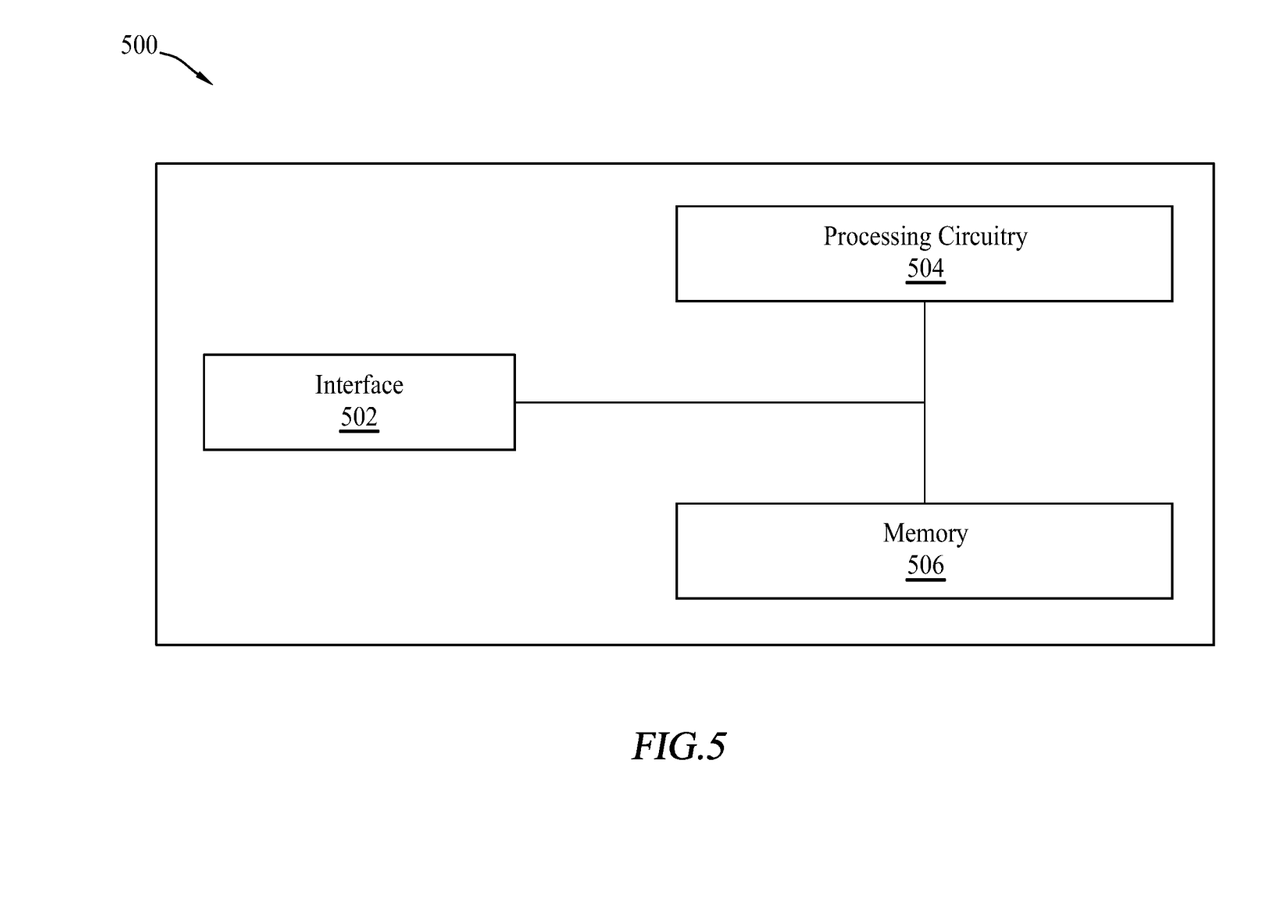
FIG. 5 illustrates an example of computing components, according to certain embodiments.

FIG. 5 illustrates an example of computing components 500, in accordance with certain embodiments. The computing components 500 may be used to implement computer system 250. The computing components 500 may comprise any suitable hardware and/or software configured to perform the functionality described above. The computing components 500 may be implemented using shared hardware or separate hardware. In certain embodiments, computing components 500 may be distributed in a cloud network environment.

In certain embodiments, the components include one or more interface(s) 502, processing circuitry 504, and/or memory unit(s) 506. In general, processing circuitry 504 controls the operation and administration of a structure by processing information received from memory 506 and/or interface 502. Memory 506 stores, either permanently or temporarily, data or other information processed by processing circuitry 504 or received from interface 502. Interface 502 receives input, sends output, processes the input and/or output and/or performs other suitable operations. An interface 502 may comprise hardware and/or software.

Examples of interfaces 502 include user interfaces, network interfaces, and internal interfaces. Examples of user interfaces include one or more graphical user interfaces (GUIs), buttons, microphones, speakers, cameras, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 504 to exchange information with or through a network. Internal interfaces receive and transmit information among internal components of a structure.

Processing circuitry 504 communicatively couples to interface(s) 502 and memory 506, and includes any hardware and/or software that operates to control and process information. Processing circuitry 504 may include a programmable logic device, a microcontroller, a microprocessor, any suitable processing device, or any suitable combination of the preceding. Processing circuitry 504 may execute logic stored in memory 506. The logic is configured to perform functionality described herein. In certain embodiments, the logic is configured to perform the method described with respect to FIG. 4.

Memory 506 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 506 may be local/integrated with the hardware used by processing circuitry 504 and/or remote/external to the hardware used by processing circuitry 504.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

What is claimed is:

1. A system comprising:
    a robotic arm comprising a laser head and a touch probe; and
    a computer system communicatively coupled to the robotic arm, the computer system configured to control the system to:
        rotate an aircraft canopy;
        during rotation of the aircraft canopy, probe, using the touch probe, the aircraft canopy, wherein probing the aircraft canopy with the touch probe determines a plurality of surface measurements of the aircraft canopy relative to the position of the robotic arm;
        create a three-dimensional model of the aircraft canopy using the plurality of surface measurements; and
        during rotation of the aircraft canopy, ablate, using a plurality of predetermined parameters and the laser head of the robotic arm, an interface layer located between a transparent outer layer and the aircraft canopy, wherein a distance between the laser head and an outer surface of the transparent outer layer is controlled by the computer system using the plurality of surface measurements during the ablation of the interface layer.

2. The system of claim 1, wherein the predetermined parameters comprise:
    a laser fluence;
    a speed;
    a wavelength; and
    a focal distance.

3. The system of claim 2, wherein the wavelength is selected based on a material of the interface layer.

4. The system of claim 2, wherein the focal distance is selected so that light from the laser head passes through the transparent outer layer and is focused on the interface layer.

5. The system of claim 1, wherein the laser head comprises a near infrared (NIR) laser.

6. The system of claim 5, wherein the laser is a Neodymium laser.

7. The system of claim 1, further comprising an enclosure that houses the robotic arm, a rotisserie control linkage, and a transport cart, the enclosure comprising one or more laser safety windows.

8. A system comprising:
    a robotic arm comprising a laser head and a touch probe;
    a rotisserie control linkage configured to couple to a transport cart; and
    a computer system communicatively coupled to the robotic arm and the rotisserie control linkage, the computer system configured to control the system to:
        rotate an aircraft canopy on the transport cart using the rotisserie control linkage;
        during the rotation of the aircraft canopy on the transport cart, probe, using the touch probe of the robotic arm, an aircraft canopy, wherein probing the aircraft canopy with the touch probe determines a plurality of surface measurements of the aircraft canopy relative to the position of the robotic arm;
        create a three-dimensional model of the aircraft canopy using the plurality of surface measurements; and
        during the rotation of the aircraft canopy on the transport cart, ablate, using a plurality of predetermined parameters and the laser head of the robotic arm, an interface layer located between a transparent outer layer and the aircraft canopy, wherein a distance between the laser head and an outer surface of the transparent outer layer is controlled by the computer system using the plurality of surface measurements during the ablation of the interface layer.

9. The system of claim 8, wherein the predetermined parameters comprise:
    a laser fluence;
    a speed;
    a wavelength; and
    a focal distance.

10. The system of claim 9, wherein the wavelength is selected based on a material of the interface layer.

11. The system of claim 9, wherein the focal distance is selected so that light from the laser head passes through the transparent outer layer and is focused on the interface layer.

12. The system of claim 8, wherein the laser head comprises a near infrared (NIR) laser.

13. The system of claim 12, wherein the laser is a Neodymium laser.

14. The system of claim 8, further comprising an enclosure that houses the robotic arm, rotisserie control linkage, and the transport cart, the enclosure comprising one or more laser safety windows.

15. A method comprising:
rotating an aircraft canopy;
during rotation of the aircraft canopy, probing, using a touch probe, the aircraft canopy, wherein probing the aircraft canopy with the touch probe determines a plurality of surface measurements of the aircraft canopy relative to the position of a robotic arm;
creating a three-dimensional model of the aircraft canopy using the plurality of surface measurements; and
during rotation of the aircraft canopy, ablating, using a plurality of predetermined parameters and a laser head of the robotic arm, an interface layer located between a transparent outer layer and the aircraft canopy, wherein a distance between the laser head and an outer surface of the transparent outer layer is controlled using the plurality of surface measurements during the ablation of the interface layer.

16. The method of claim 15, wherein the predetermined parameters comprise:
a laser fluence;
a speed;
a wavelength; and
a focal distance.

17. The method of claim 16, wherein the wavelength is selected based on a material of the interface layer.

18. The method of claim 16, wherein the focal distance is selected so that light from the laser head passes through the transparent outer layer and is focused on the interface layer.

19. The method of claim 15, wherein the laser head comprises a near infrared (NIR) laser.

20. The system of claim 19, wherein the laser is a Neodymium laser.

* * * * *